US012526048B2

(12) United States Patent
Wang et al.

(10) Patent No.: US 12,526,048 B2
(45) Date of Patent: Jan. 13, 2026

(54) DATA RECEIVING METHOD, RECEIVING APPARATUS, AND RELATED DEVICE

(71) Applicant: Huawei Technologies Co., Ltd., Shenzhen (CN)

(72) Inventors: You Wang, Wuhan (CN); Wei Li, Wuhan (CN); Shengwen Feng, Shenzhen (CN); Qiang Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 18/464,148

(22) Filed: Sep. 8, 2023

(65) Prior Publication Data

US 2023/0421260 A1 Dec. 28, 2023

Related U.S. Application Data

(63) Continuation of application No. PCT/CN2022/078936, filed on Mar. 3, 2022.

(30) Foreign Application Priority Data

Mar. 10, 2021 (CN) .......................... 202110261186.6

(51) Int. Cl.
*H04B 10/2507* (2013.01)
*H04B 1/525* (2015.01)
*H04B 10/071* (2013.01)

(52) U.S. Cl.
CPC ......... *H04B 10/2507* (2013.01); *H04B 1/525* (2013.01); *H04B 10/071* (2013.01)

(58) Field of Classification Search
CPC .. H04B 10/2507; H04B 1/525; H04B 10/071; H04B 10/25; H04B 10/2537
See application file for complete search history.

(56) References Cited

U.S. PATENT DOCUMENTS 11,245,475 B2 * 2/2022 Cavaliere ............. H04B 10/516

OTHER PUBLICATIONS

Mu Xu et al.,"Efficient Echo-Cancellation Algorithms for Full Duplex Coherent Optical Systems." Mar. 8-12, 2020, total 3 pages.

* cited by examiner

*Primary Examiner* — John Bedtelyon
(74) *Attorney, Agent, or Firm* — Slater Matsil, LLP

(57) ABSTRACT

A method includes: a first device sends a first data frame to a second device, where the first data frame includes an LFMS a1; the first device receives a mixed signal, where the mixed signal includes a first reflected data frame of the first data frame and a second data frame sent by the second device; the first device obtains a first offset based on the LFMS a1 in the first reflected data frame, and obtains a reconstructed data frame of the first reflected data frame based on the first data frame; and the first device eliminates the reconstructed data frame of the first reflected data frame from the mixed signal based on the first offset.

20 Claims, 10 Drawing Sheets

DATA RECEIVING METHOD, RECEIVING APPARATUS, AND RELATED DEVICE

CROSS-REFERENCE TO RELATED APPLICATIONS

This application is a continuation of International Application No. PCT/CN2022/078936, filed on Mar. 3, 2022, which claims priority to Chinese Patent Application No. 202110261186.6, filed on Mar. 10, 2021. The disclosures of the aforementioned applications are hereby incorporated by reference in their entireties.

TECHNICAL FIELD

This application relates to the field of optical communication, and in particular, to a data receiving method, a receiving apparatus, and a related device.

BACKGROUND

In a same-wavelength single-fiber bidirectional optical communication system, a signal generated by an eastbound terminal and a signal generated by a westbound terminal share a same optical fiber and use a same communication frequency band. Therefore, an overall communication capacity of the system can be doubled.

However, Fresnel reflection is generated when the system has a connector end face of an optical fiber. Therefore, for a mixed signal received by the eastbound terminal, the mixed signal not only includes the signal generated by the westbound terminal, but also includes a reflected crosstalk signal of the signal generated by the eastbound terminal. Because the signal generated by the westbound terminal and the reflected crosstalk signal belong to a same communication frequency band, the eastbound terminal cannot eliminate the reflected crosstalk signal by filtering. To this end, the reflected crosstalk signal may be reconstructed by using the signal generated by the eastward terminal. Then, the reconstructed reflected crosstalk signal may be eliminated from the mixed signal to obtain the signal generated by the westbound terminal.

In actual application, there may be a time difference between a time at which the reflected crosstalk signal arrives at the eastbound terminal and a time at which the signal generated by the westbound terminal arrives at the eastbound terminal, and the time difference affects quality of the obtained signal, degrading communication quality.

SUMMARY

This application provides a data receiving method, a receiving apparatus, and a related device, so as to eliminate a reconstructed data frame of a first reflected data frame from a mixed signal by using a first offset, thereby reducing impact of a time difference and improving communication quality.

A first aspect of this application provides a method for reducing reflected crosstalk. The method includes: A first device sends a first data frame to a second device, where the first data frame includes a linear frequency modulated sequence LFMS a1. Then, the first device receives a mixed signal, where the mixed signal includes a first reflected data frame of the first data frame and a second data frame sent by the second device. The first device obtains a first offset based on the LFMS a1 in the first reflected data frame, where the first offset is a time-domain offset between the first reflected data frame and the second data frame. After the first offset is obtained, the first device obtains a reconstructed data frame of the first reflected data frame based on the first data frame. Then, the first device eliminates the reconstructed data frame of the first reflected data frame from the mixed signal based on the first offset, to obtain a first initial signal of the second data frame. Specifically, the first device may eliminate the reconstructed data frame from the mixed signal when an offset between the reconstructed data frame of the first reflected data frame and the second data frame is the first offset. Then, the first device performs subsequent digital signal processing on the first initial signal, for example, carrier phase recovery and channel equalization.

In this application, the first device obtains the first offset by using the LFMS a1 in the first reflected data frame, that is, determines a time difference between the first reflected data frame and the second data frame in the mixed signal. In addition, the first device eliminates the reconstructed data frame of the first reflected data frame from the mixed signal based on the first offset. Therefore, impact of the time difference is reduced, and communication quality is further improved.

In an optional manner of the first aspect, the second data frame includes an LFMS a3. The first device obtains a first delay based on the LFMS a1 in the first reflected data frame, where the first delay is used to represent a time difference between a moment at which the first device receives the first reflected data frame and a reference moment. The first device obtains a second delay based on the LFMS a3 in the second data frame, where the second delay is used to represent a time difference between a moment at which the first device receives the second data frame and the reference moment. The first offset is equal to a difference between the first delay and the second delay.

In an optional manner of the first aspect, the reference moment is a moment at which the first device sends the first data frame.

In an optional manner of the first aspect, the first device performs fractional Fourier transform at an angle a1 on K first sequences to obtain K first functions. Then, the first device separately obtains maximum modulus values of the K first functions to obtain K maximum modulus values. The K first sequences are K sequence blocks that are obtained by dividing the mixed signal in time domain and whose lengths are equal to that of the LFMS a1, and K is an integer greater than 1. The first delay is equal to a difference between the reference moment and a start moment of a first target sequence in the K first sequences, and the first target sequence corresponds to a maximum value in the K maximum modulus values.

In an optional manner of the first aspect, the first data frame further includes an LFMS a2, and the second data frame further includes an LFMS a4. The first device performs fractional Fourier transform at the angle a1 on the LFMS a1 to obtain an a1 impulse function, where a horizontal coordinate of a maximum modulus value of the a1 impulse function is U1, a horizontal coordinate of a first target modulus value is U2, and an a1 independent-variable difference $\Delta U_{a1} = U2 - U1$. The first device performs fractional Fourier transform at an angle a2 on H second sequences to obtain H second functions. Then, the first device separately obtains maximum modulus values of the H second functions to obtain H maximum modulus values. The H second sequences are H sequence blocks that are obtained by dividing the mixed signal in time domain and whose lengths are equal to that of the LFMS a2, and H is an integer greater than 1. The first device performs fractional Fourier transform at the angle a2 on the LFMS a2 to obtain an a2 impulse function, where a horizontal coordinate of a maximum modulus value of the a2 impulse function is U3, a horizontal coordinate of a second target modulus value is U4, the second target modulus value is a maximum value in the H maximum modulus values, and an a2 independent-variable difference $\Delta U_{a2}$=U4−U3. The first device obtains a first corrected value based on $\Delta U_{a1}$ and $\Delta U_{a2}$. The first device corrects the first delay based on the first corrected value. Correcting the first delay by using the first corrected value can improve accuracy of the first delay, that is, improve accuracy of the first offset obtained based on the first delay. Accuracy may be understood as a degree of similarity between an obtained value and an actual value. In addition, higher accuracy of the first offset indicates a better effect of eliminating the reconstructed data frame and higher quality of an obtained signal. Therefore, impact of the first offset can be further reduced, and communication quality can be further improved.

In an optional manner of the first aspect, the first offset is equal to a difference between a corrected first delay and the second delay.

In an optional manner of the first aspect, the first device obtains the first corrected value based on the following formulas: $\Delta U_{a1}=\Delta t1 \cos(a1)+\Delta f_a \sin(a1)$ and $\Delta U_{a2}=\Delta t1 \cos(a2)+\Delta f_a \sin(a2)$. $\Delta t1$ is the first corrected value, $\Delta f_a$ is a frequency offset between the first data frame and the first reflected data frame, a1 is an angle of the LFMS a1, and a2 is an angle of the LFMS a2. The first corrected value in this application takes impact of frequency deviation into consideration, so that the accuracy of the first delay can be further improved, and communication quality can be further improved.

In an optional manner of the first aspect, the LFMS a1 is the same as the LFMS a3, and the LFMS a4 is the same as the LFMS a2.

In an optional manner of the first aspect, in frequency domain, the LFMS a1 overlaps the LFMS a2, and the LFMS a3 overlaps the LFMS a4. The LFMS a1 does not overlap the LFMS a3, and a sum of frequency ranges of the LFMS a1 and the LFMS a3 is equal to a frequency range of a payload of the first data frame or the second data frame. By defining the foregoing content, the accuracy of each of the first delay and the second delay that are obtained by the first device can be improved, that is, the accuracy of the first offset is improved. Therefore, impact of the first offset can be further reduced, and communication quality can be further improved.

In an optional manner of the first aspect, in time domain, the LFMS a1 and/or the LFMS a2 are/is before the payload of the first data frame. As the LFMS a1 and/or the LFMS a2 are/is before the payload, the first device may first receive the first target sequence and/or a second target sequence that are/is in the first reflected data frame, and then receive the payload. The first target sequence includes a part or a whole of the LFMS a1 in the first reflected data frame, and the second target sequence includes a part or a whole of the LFMS a2 in the first reflected data frame. After receiving the first target sequence and the second target sequence, the first device may start to calculate the first offset. Therefore, a speed of obtaining the first offset by the first device can be improved, that is, a delay between the first device and the second device is reduced.

In an optional manner of the first aspect, in time domain, the LFMS a1 does not overlap the LFMS a2, and the LFMS a1 and the LFMS a2 do not overlap the payload of the first data frame. By defining the foregoing content, the accuracy of the first delay obtained by the first device can be improved, that is, the accuracy of the first offset is improved. Therefore, impact of the first offset can be further reduced, and communication quality can be further improved.

In an optional manner of the first aspect, the first data frame further includes an LFMS b1. The method further includes: The first device obtains carrier phase information of the first reflected data frame based on the LFMS b1 in the first reflected data frame. The first device obtains the reconstructed data frame of the first reflected data frame based on the first data frame and the carrier phase information. In a transmission process, the first data frame sent by the first device is affected by the carrier phase information (noise and a frequency offset). Therefore, performing reconstruction by using the carrier phase information can improve accuracy of the reconstructed data frame of the first reflected data frame. In addition, higher accuracy of the reconstructed data frame of the first reflected data frame indicates a better effect of eliminating the reconstructed data frame and higher quality of an obtained signal. Therefore, communication quality can be further improved.

In an optional manner of the first aspect, before the first device obtains the carrier phase information of the first reflected data frame based on the LFMS b1 in the first reflected data frame, the method further includes: the first device performs fractional Fourier transform at an angle b1 on the LFMS b1 to obtain a b1 impulse function, where a horizontal coordinate of a maximum modulus value of the b1 impulse function is $\Delta U_{b1}$. The first device obtains a frequency offset value $\Delta f_b$ based on $\Delta U_{b1}$, where $\Delta U_{b1}=\Delta f_b \times \sin(b1)$, $\Delta f_b$ is a frequency offset obtained after $\Delta f_a$ is corrected, and b1 is an angle of the LFMS b1. The first device performs frequency deviation on the LFMS b1 in the first reflected data frame by using $\Delta f_b$. In a optical signal transmission process, a frequency of optical signal may change, that is, frequency deviation exists between the first reflected data frame and the first data frame. In this application, the first device first obtains the frequency offset value $\Delta f_b$ between the first reflected data frame and the first data frame, and then performs frequency deviation on the first reflected data frame by using $\Delta f_b$, to extract the carrier phase information from the first reflected data frame after the frequency deviation. Therefore, a degree of frequency adaptation between the carrier phase information and the first data frame can be improved, that is, the accuracy of the reconstructed data frame of the first reflected data frame is improved. Therefore, communication quality can be further improved.

In an optional manner of the first aspect, the first device extracts the first reflected data frame in the mixed signal. The first device obtains, by filtering, the LFMS b1 in the first reflected data frame. The first device performs fractional Fourier transform on the LFMS b1 in the first reflected data frame to obtain a b1 impulse function. The first device performs inverse fractional Fourier transform on a target impulse function to obtain an LFMS b2, where the target impulse function is a part that is in the b1 impulse function and that includes a maximum modulus value. The first device performs frequency deviation on the LFMS b2 by using $\Delta f_b$. The first device performs division on the LFMS b2 and the LFMS b1 to obtain a complex-valued function; and the first device obtains the carrier phase information of the complex-valued function.

In an optional manner of the first aspect, a time range of the LFMS b1 overlaps a time range of the first data frame, and the time range of the first data frame is equal to a sum of a time range of the payload of the first data frame, a time range of the LFMS a1, and a time range of the LFMS a2. By defining the foregoing content, accuracy of the carrier phase information obtained by the first device can be improved, that is, accuracy of a reconstructed data frame that is subsequently reconstructed is improved. Therefore, communication quality can be further improved.

In an optional manner of the first aspect, a frequency spacing between the LFMS b1 and the payload of the first data frame is greater than a first threshold. When the LFMS b1 overlaps the payload of the first data frame in frequency domain, because power of the LFMS b1 in the first reflected data frame is less than power of the payload, the LFMS b1 in the first reflected data frame is covered by the payload. Therefore, this is not conducive to obtaining, by the first device by filtering in frequency domain, the LFMS b1 in the first reflected data frame, and affects accuracy of the subsequently extracted carrier phase information. Therefore, in this application, accuracy of the obtained carrier phase information can be improved, that is, accuracy of a reconstructed data frame that is subsequently reconstructed is improved. Therefore, communication quality can be further improved in this application.

In an optional manner of the first aspect, the mixed signal further includes a second reflected data frame of the first data frame. The first device obtains a second offset based on the LFMS a1 in the first reflected data frame, where the second offset is a time-domain offset between the second reflected data frame and the second data frame. The first device obtains a reconstructed data frame of the second reflected data frame based on the first data frame. The first device eliminates the reconstructed data frame of the second reflected data frame from the first initial signal based on the second offset, to obtain a second initial signal of the second data frame. The mixed signal may include a plurality of reflected crosstalk signals of the first data frame. The first device not only eliminates the reconstructed data frame of the first reflected data frame from the mixed signal, but also eliminates the reconstructed data frame of the second reflected data frame from the obtained first initial signal. Therefore, quality of an obtained signal can be further improved.

In an optional manner of the first aspect, power of the second reflected data frame is less than power of the first reflected data frame. Compared with that the first device first eliminates the second reflected data frame and then eliminates the first data frame, in this application, quality of the finally obtained second initial signal can be improved. Therefore, quality of an obtained signal can be further improved in this application.

A second aspect of this application provides a receiving apparatus. The receiving apparatus includes: a sending module, configured to send a first data frame to a second device, where the first data frame includes a linear frequency modulated sequence LFMS a1; a receiving module, configured to receive a mixed signal, where the mixed signal includes a first reflected data frame of the first data frame and a second data frame sent by the second device; a processing module, configured to obtain a first offset based on the LFMS a1 in the first reflected data frame, where the first offset is a time-domain offset between the first reflected data frame and the second data frame; a reconstruction module, configured to obtain a reconstructed data frame of the first reflected data frame based on the first data frame; and an elimination module, configured to eliminate the reconstructed data frame of the first reflected data frame from the mixed signal based on the first offset, to obtain a first initial signal of the second data frame.

In an optional manner of the second aspect, the second data frame includes an LFMS a3. The processing module is specifically configured to obtain a first delay based on the LFMS a1 in the first reflected data frame, where the first delay is used to represent a time difference between a moment at which a receiving apparatus receives the first reflected data frame and a reference moment. The processing module is specifically configured to obtain a second delay based on the LFMS a3 in the second data frame, where the second delay is used to represent a time difference between a moment at which the receiving apparatus receives the second data frame and the reference moment. The first offset is equal to a difference between the first delay and the second delay.

In an optional manner of the second aspect, the reference moment is a moment at which the receiving apparatus sends the first data frame.

In an optional manner of the second aspect, the processing module is specifically configured to perform fractional Fourier transform at an angle a1 on K first sequences to obtain K maximum modulus values of K first functions. Each first function corresponds to one maximum modulus value. The K first sequences are K sequence blocks that are obtained by dividing the mixed signal in time domain and whose lengths are equal to that of the LFMS a1, and K is an integer greater than 1. The first delay is equal to a difference between the reference moment and a start moment of a first target sequence in the K first sequences, and the first target sequence corresponds to a maximum value in the K maximum modulus values.

In an optional manner of the second aspect, the first data frame further includes an LFMS a2, and the second data frame further includes an LFMS a4. The processing module is further configured to perform fractional Fourier transform at the angle a1 on the LFMS a1 to obtain an a1 impulse function. A horizontal coordinate of a maximum modulus value of the a1 impulse function is U1, a horizontal coordinate of a first target modulus value is U2, and an a1 independent-variable difference $\Delta U_{a1}=U2-U1$. The processing module is further configured to perform fractional Fourier transform at an angle a2 on H second sequences to obtain H maximum modulus values of H second functions. Each second function corresponds to one maximum modulus value. The H second sequences are H sequence blocks that are obtained by dividing the mixed signal in time domain and whose lengths are equal to that of the LFMS a2, and H is an integer greater than 1. The processing module is further configured to perform fractional Fourier transform at the angle a2 on the LFMS a2 to obtain an a2 impulse function. A horizontal coordinate of a maximum modulus value of the a2 impulse function is U3, and a horizontal coordinate of a second target modulus value is U4. The second target modulus value is a maximum value in the H maximum modulus values, and an a2 independent-variable difference $\Delta U_{a2}=U4-U3$. The processing module is further configured to obtain a first corrected value based on $\Delta U_{a1}$ and $\Delta U_{a2}$. The processing module is further configured to correct the first delay based on the first corrected value.

In an optional manner of the second aspect, the first offset is equal to a difference between a corrected first delay and the second delay.

In an optional manner of the second aspect, the processing module is specifically configured to obtain the first corrected value based on the following formulas: $\Delta U_{a1}=\Delta t1 \cos(a1)+\Delta f_a \sin(a1)$ and $\Delta U_{a2}=\Delta t1 \cos(a2)+\Delta f_a \sin(a2)$. $\Delta t1$ is the first corrected value, and $\Delta f_a$ is a frequency offset between the first data frame and the first reflected data frame. a1 is an angle of the LFMS a1, and a2 is an angle of the LFMS a2.

In an optional manner of the second aspect, the LFMS a1 is the same as the LFMS a3, and the LFMS a4 is the same as the LFMS a2.

In an optional manner of the second aspect, in frequency domain, the LFMS a1 overlaps the LFMS a2, the LFMS a3 overlaps the LFMS a4, the LFMS a1 does not overlap the LFMS a3, and a sum of frequency ranges of the LFMS a3 and the LFMS a1 is equal to a frequency range of a payload of the first data frame or the second data frame.

In an optional manner of the second aspect, in time domain, the LFMS a1 and/or the LFMS a2 are/is before the payload of the first data frame.

In an optional manner of the second aspect, in time domain, the LFMS a1 does not overlap the LFMS a2, and the LFMS a1 and the LFMS a2 do not overlap the payload of the first data frame.

In an optional manner of the second aspect, the first data frame further includes an LFMS b1. The processing module is further configured to obtain carrier phase information of the first reflected data frame based on the LFMS b1 in the first reflected data frame. The reconstruction module is specifically configured to obtain the reconstructed data frame of the first reflected data frame based on the first data frame and the carrier phase information.

In an optional manner of the second aspect, the processing module is further configured to perform fractional Fourier transform at an angle b1 on the LFMS b1 to obtain a b1 impulse function, where a horizontal coordinate of a maximum modulus value of the b1 impulse function is $\Delta U_{b1}$. The processing module is further configured to obtain a frequency offset value $\Delta f_b$ based on $\Delta U_{b1}$, where $\Delta U_{b1}=\Delta f_b \times \sin(b1)$, $\Delta f_b$ is a frequency offset obtained after $\Delta f_a$ is corrected, and b1 is an angle of the LFMS b1. The processing module is further configured to perform frequency deviation on the LFMS b1 in the first reflected data frame by using $\Delta f_b$.

In an optional manner of the second aspect, the processing module is specifically configured to extract the first reflected data frame in the mixed signal; the processing module is specifically configured to obtain, by filtering, the LFMS b1 in the first reflected data frame; the processing module is specifically configured to perform fractional Fourier transform on the LFMS b1 in the first reflected data frame to obtain a b1 impulse function; the processing module is specifically configured to perform inverse fractional Fourier transform on a target impulse function to obtain an LFMS b2, where the target impulse function is a part that is in the b1 impulse function and that includes a maximum modulus value; the processing module is specifically configured to perform frequency deviation on the LFMS b2 by using $\Delta f_b$; the processing module is specifically configured to perform division on the LFMS b2 and the LFMS b1 to obtain a complex-valued function; and the processing module is specifically configured to obtain the carrier phase information of the complex-valued function.

In an optional manner of the second aspect, a time range of the LFMS b1 overlaps a time range of the first data frame. The time range of the first data frame is equal to a sum of a time range of the payload of the first data frame, a time range of the LFMS a1, and a time range of the LFMS a2.

In an optional manner of the second aspect, a frequency spacing between the LFMS b1 and the payload of the first data frame is greater than a first threshold.

In an optional manner of the second aspect, the first threshold is greater than 1 GHz.

In an optional manner of the second aspect, the mixed signal further includes a second reflected data frame of the first data frame. The processing module is further configured to obtain a second offset based on the LFMS a1 in the first reflected data frame, where the second offset is a time-domain offset between the second reflected data frame and the second data frame. The reconstruction module is further configured to obtain a reconstructed data frame of the second reflected data frame based on the first data frame. The elimination module is further configured to eliminate the reconstructed data frame of the second reflected data frame from the first initial signal based on the second offset, to obtain a second initial signal of the second data frame.

In an optional manner of the second aspect, power of the second reflected data frame is less than power of the first reflected data frame.

A third aspect of this application provides a receiving device. The receiving device includes a transceiver and a processor. The transceiver is configured to send a first data frame to a second device, where the first data frame includes a linear frequency modulated sequence LFMS a1. The transceiver is further configured to receive a mixed signal, where the mixed signal includes a first reflected data frame of the first data frame and a second data frame sent by the second device. The processor is configured to perform the method according to any one of the first aspect or the optional manners of the first aspect based on the first data frame and the mixed signal.

A fourth aspect of this application provides a chip. The chip includes one or more circuits and an interface. The interface is configured to receive a mixed signal, where the mixed signal includes a first reflected data frame of a first data frame and a second data frame sent by a second device. The one or more circuits are configured to perform the method according to any one of the first aspect or the optional manners of the first aspect based on the first data frame and the mixed signal.

A fifth aspect of this application provides a computer storage medium, where the computer storage medium stores instructions, and when the instructions are executed on a computer, the computer is enabled to perform the method according to any one of the first aspect or the optional manners of the first aspect.

A sixth aspect of this application provides a computer program product, where when the computer program product is executed on a computer, the computer is enabled to perform the method according to any one of the first aspect or the optional manners of the first aspect.

DETAILED DESCRIPTION OF ILLUSTRATIVE EMBODIMENTS

This application provides a data receiving method, a receiving apparatus, and a related device, so as to eliminate a reconstructed data frame of a first reflected data frame from a mixed signal by using a first offset, thereby reducing impact of a time difference and improving communication quality. It should be understood that, in descriptions of embodiments of this application, "first", "second", and the like are used only for purposes of distinguishing between the descriptions, and cannot be understood as indicating or implying relative importance, or as indicating or implying a sequence.

Figure 1:
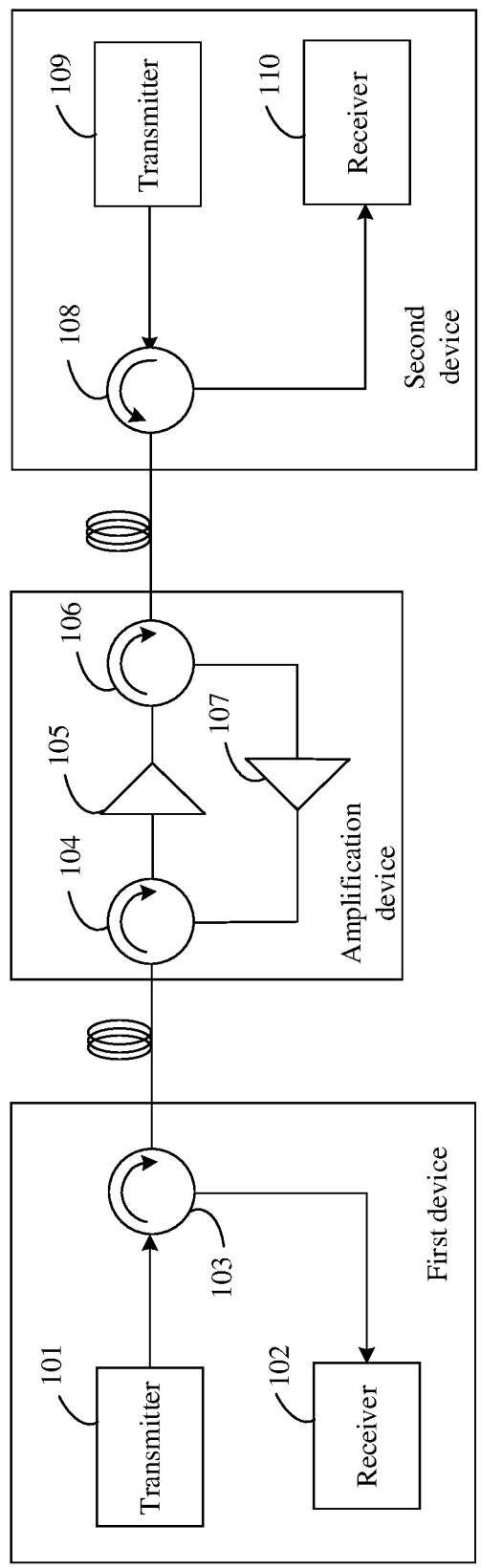
FIG. 1 is a schematic diagram of a network framework of a bidirectional optical communication system over a single fiber.

A method, an apparatus, and a related device that are provided in this application are applied to the field of optical communication, and specifically, may be applied to a bidirectional optical communication system over a single fiber. FIG. 1 is a schematic diagram of a network framework of a bidirectional optical communication system over a single fiber. As shown in FIG. 1, the system includes a first device (also referred to as an eastbound terminal), an amplification device, and a second device (also referred to as a westbound terminal). The first device includes a transmitter 101, a circulator 103, and a receiver 102. The amplification device includes a circulator 104, an amplifier 105, a circulator 106, and an amplifier 107. The second device includes a circulator 108, a transmitter 109, and a receiver 110.

The first device generates a first optical signal (also referred to as a first data frame) by using the transmitter 101. The first optical signal is transmitted over an optical fiber 1 to the amplification device after passing through the circulator 103. After passing through the circulator 104 in the amplification device, the first optical signal sequentially passes through the amplifier 105 and the circulator 106. The first optical signal output from the circulator 106 is transmitted over an optical fiber 2 to the circulator 108 of the second device to enter the receiver 110. Similarly, a second optical signal (also referred to as a second data frame) generated by the transmitter 109 of the second device sequentially passes through the circulator 108, the optical fiber 2, the circulator 106, the amplifier 107, the circulator 104, the optical fiber 1, the circulator 103, and the receiver 102.

The first device may not only receive the second optical signal sent by the second device, but also receive a reflected signal of the first optical signal, for example, a reflected signal generated due to Fresnel reflection on a connector end face of an optical fiber. For example, there is a connector end face between the optical fiber 1 and the circulator 103. When the first optical signal enters the optical fiber 1 by using the circulator 103, a reflected signal of the first optical signal is generated. The reflected signal is looped back to the receiver 102 of the first device by using the circulator 103. In a same-wavelength single-fiber bidirectional optical communication system, because a frequency band of the first optical signal is the same as a frequency band of the second optical signal, a frequency band of the reflected signal of the first optical signal is the same as the frequency band of the second optical signal. Therefore, the first device cannot eliminate the reflected signal simply in a filtering manner.

A manner of eliminating the reflected signal is to reconstruct the reflected signal by using the first optical signal, to obtain a reflected reconstructed signal. The reflected reconstructed signal is eliminated from a mixed signal received by the first device.

Figure 2:
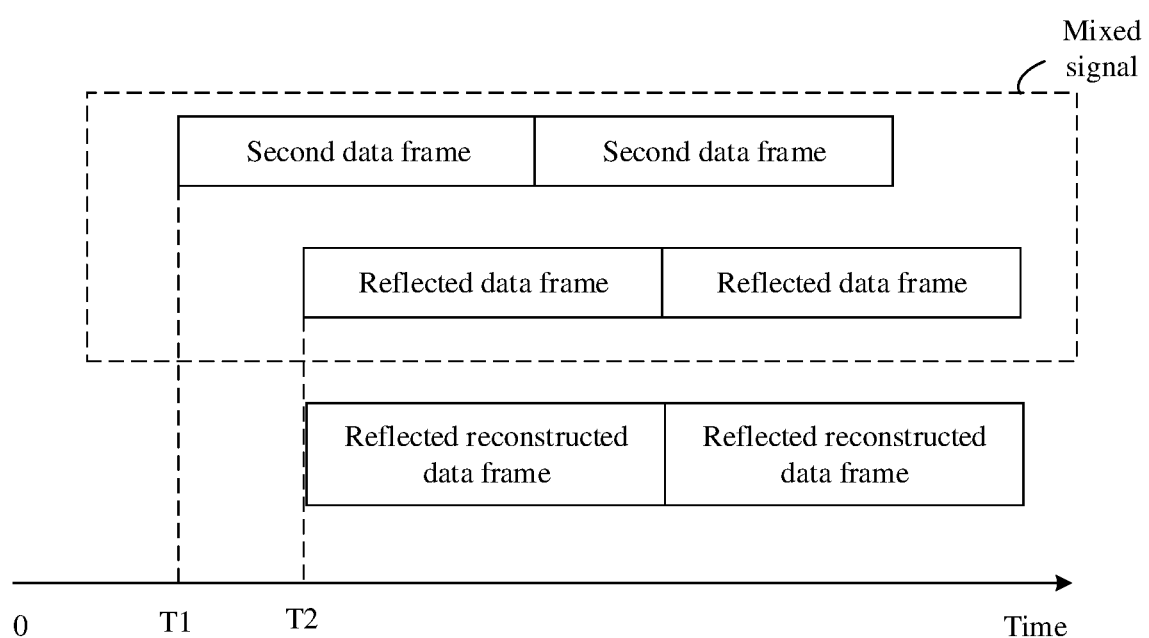
FIG. 2 is a schematic diagram of structures of a mixed signal and a reflected reconstructed signal in time domain.

However, in the mixed signal received by the first device, there is a time difference between the second optical signal and the reflected signal. The time difference affects an elimination result, that is, affects quality of an obtained signal. Specifically, FIG. 2 is a schematic diagram of structures of a mixed signal and a reflected reconstructed signal in time domain. As shown in FIG. 2, the second optical signal includes a second data frame, the reflected signal includes a reflected data frame, and the reflected reconstructed signal includes a reflected reconstructed data frame. A time difference T2-T1 exists between the second data frame and the reflected data frame. Therefore, when the reflected reconstructed signal is eliminated from the mixed signal, the time difference T2-T1 also needs to exist between the reflected reconstructed signal and the second data frame in the mixed signal. Otherwise, quality of an obtained signal is affected, and communication quality is degraded.

To this end, this application provides a data receiving method. In the method, a first data frame sent by a first device to a second device carries an LFMS a1. A mixed signal received by the first device includes a second data frame sent by the second device and a first reflected data frame of the first data frame. The first reflected data frame is a reflected signal of the first data frame. After the first device receives the mixed signal, the first device obtains a first offset between the second data frame and the first reflected data frame based on the LFMS a1 in the first reflected data frame. The first offset is a time-domain offset (which may be understood as the foregoing time difference T2-T1) between the first reflected data frame and the second data frame. Then, the first device eliminates a reconstructed data frame of the first reflected data frame from the mixed signal based on the first offset, to obtain a first initial signal of the second data frame. The following describes an application scenario of the data receiving method.

Figure 3:
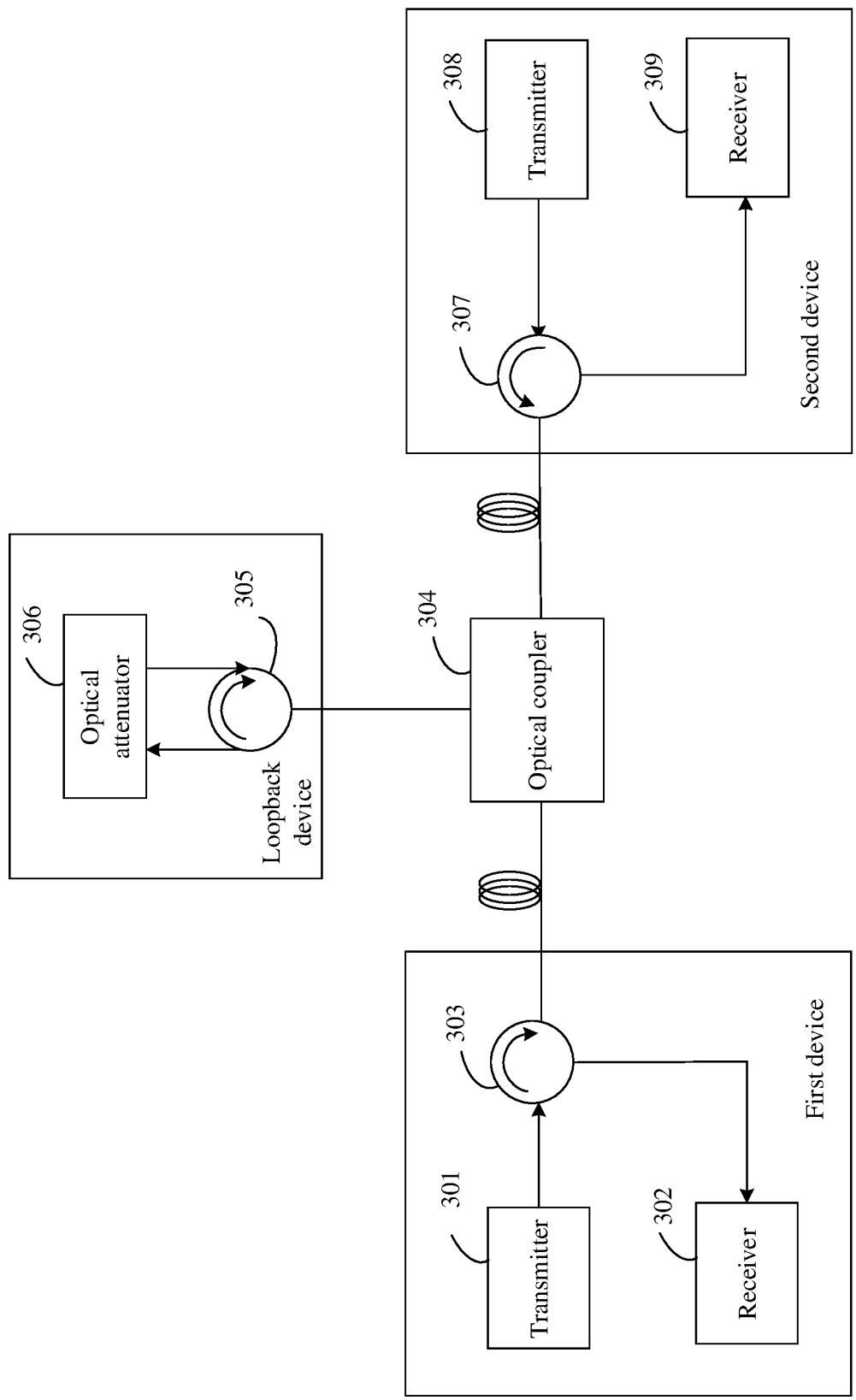
FIG. 3 is a schematic diagram of another network framework of a bidirectional optical communication system over a single fiber according to this application.

It should be understood that, the schematic diagram of the network framework shown in FIG. 1 is merely an example, and a person skilled in the art may make an adaptive change based on a technical principle thereof. For example, the circulator 104 and the circulator 106 are in counterclockwise directions. For example, the bidirectional optical communication system over a single fiber does not include the amplification device. For example, FIG. 3 is a schematic diagram of another network framework of a bidirectional optical communication system over a single fiber according to this application. As shown in FIG. 3, the system includes a first device, a loopback device, and a second device. The first device includes a transmitter 301, a circulator 303, and a receiver 302. The loopback device includes a circulator 305 and an optical attenuator 306. The second device includes a circulator 307, a transmitter 308, and a receiver 309.

The first device generates a first optical signal by using the transmitter 301. The first optical signal is transmitted over an optical fiber to an optical coupler 304 after passing through the circulator 303. After passing through the optical coupler 304, the first optical signal enters the loopback device. Then, the first optical signal enters the optical attenuator 306 through the circulator 305, and then is returned by the optical attenuator 306 to the circulator 305. In this case, the first optical signal returned by the optical attenuator 306 is also referred to as a reflected signal of the first optical signal. The reflected signal is returned to the receiver 302 of the first device by using the optical coupler 304. Power of the reflected signal may be controlled by setting an attenuation degree of the optical attenuator 306. Therefore, the system shown in FIG. 3 may be configured to simulate a process of eliminating a reflected reconstructed signal, and further test a result of the data receiving method.

Figure 4:
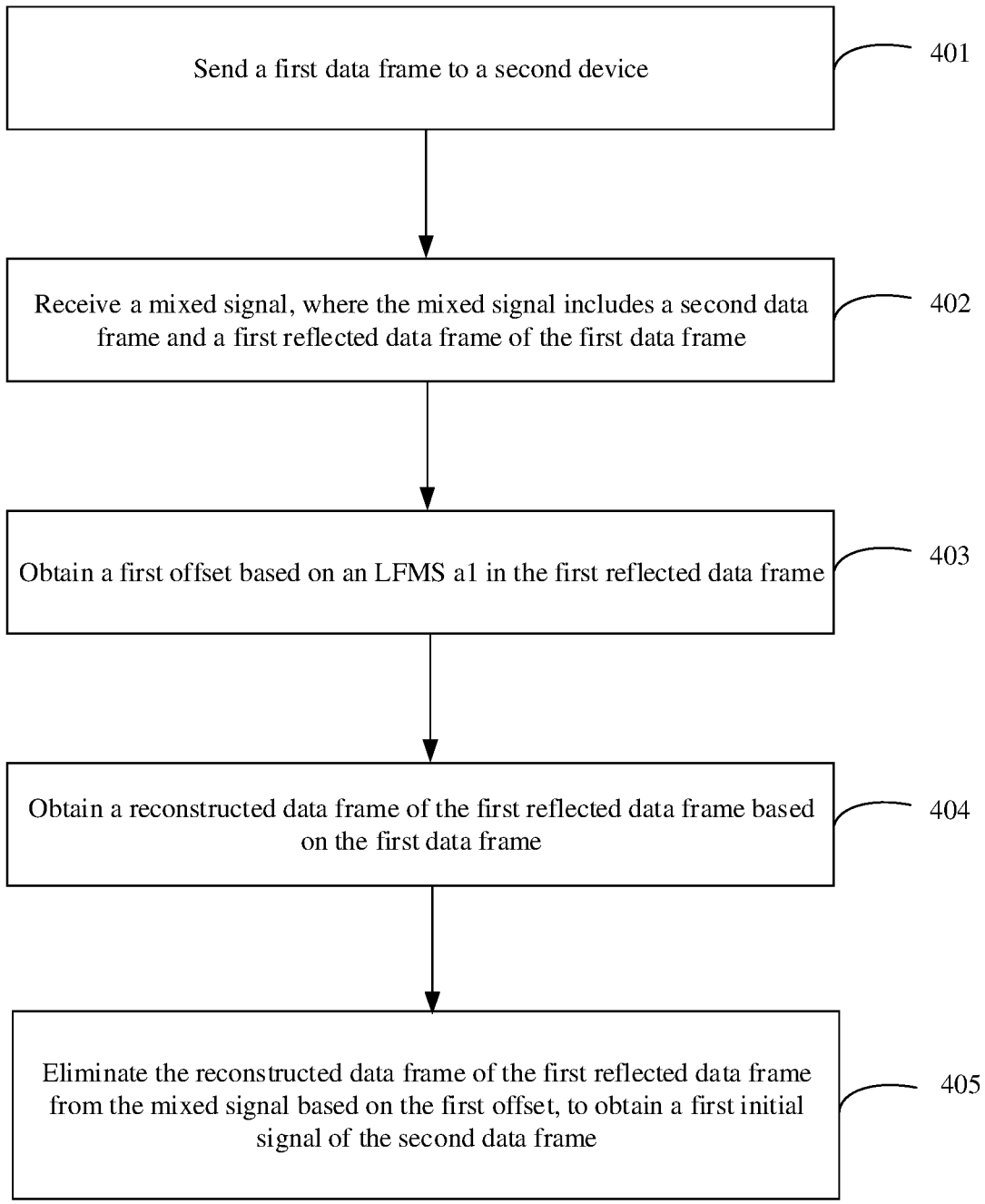
FIG. 4 is a schematic flowchart of a data receiving method according to this application.

Other possible application scenarios are not listed one by one in this application. The following describes the data receiving method in this application by using the application scenario in FIG. 1 as an example. FIG. 4 is a schematic flowchart of a data receiving method according to this application. As shown in FIG. 4, the data receiving method includes the following steps.

In step 401, a first device sends a first data frame to a second device.

Figure 5:
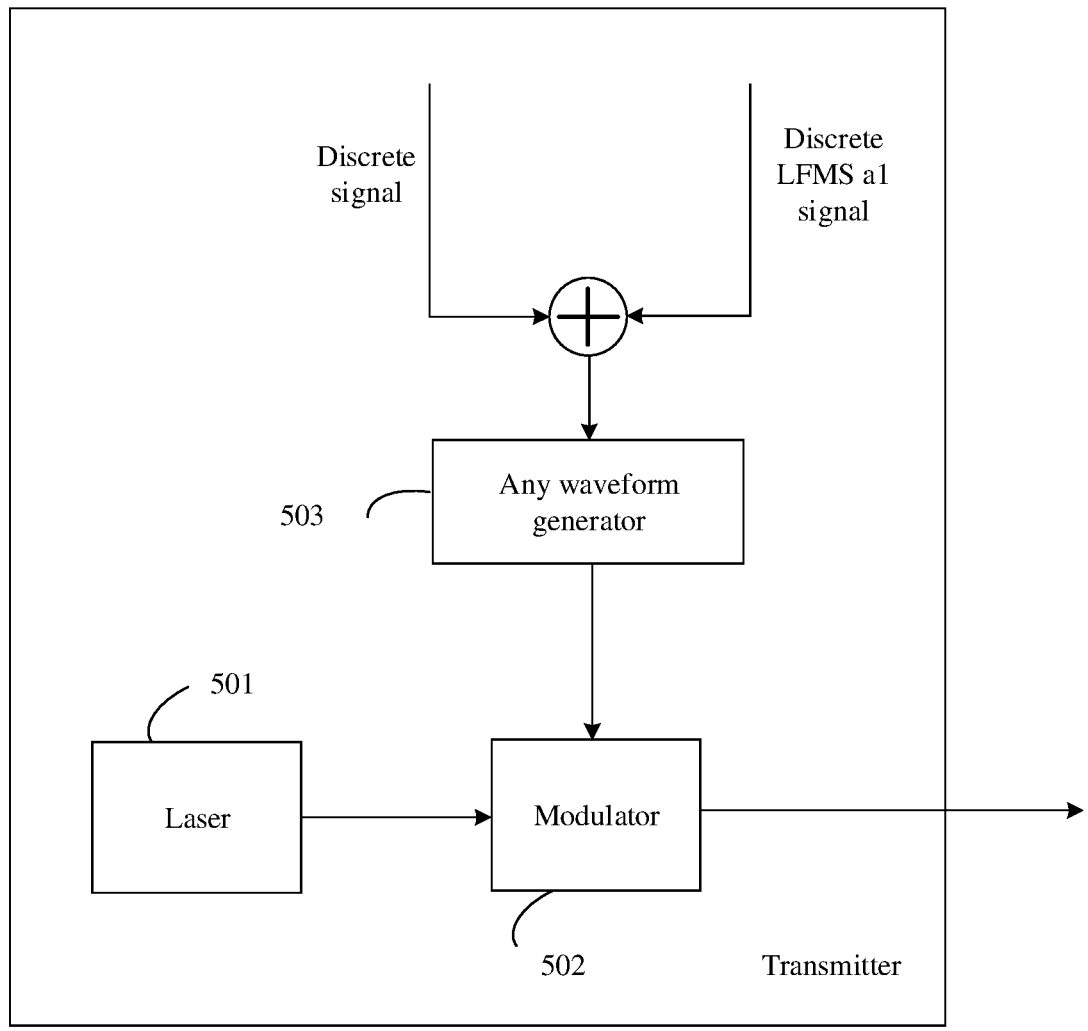
FIG. 5 is a schematic diagram of a structure of a transmitter according to this application.

The first device includes a transmitter and a receiver. FIG. 5 is a schematic diagram of a structure of a transmitter according to this application. As shown in FIG. 5, the transmitter includes a laser 501, a modulator 502, and an arbitrary waveform generator (AWG) 503. A discrete signal is used to generate a payload, and a discrete LFMS a1 signal is used to generate an LFMS a1. In this application, content carried in a payload is not limited, and therefore, no related limitation is imposed on a discrete signal. The transmitter first mixes the discrete signal with the discrete LFMS a1 signal to generate a digital signal corresponding to the first data frame. The AWG 503 converts the digital signal into an analog signal, and provides the analog signal for the modulator 502. The modulator 502 modulates, based on the analog signal, continuous laser light generated by the laser 501, to generate a first optical signal. The first optical signal includes one or more first data frames.

A linear frequency modulated sequence (LFMS) is essentially a special sequence whose frequency varies linearly with time. A mathematical expression of the linear frequency modulated sequence may be represented by using the following formula:

$$s(t)=\exp[i\pi(2f_0 t+f_M t^2)]$$

$f_0$ is a start frequency of the LFMS, and $f_M$ is a frequency modulation slope of the LFMS.

Figure 6:
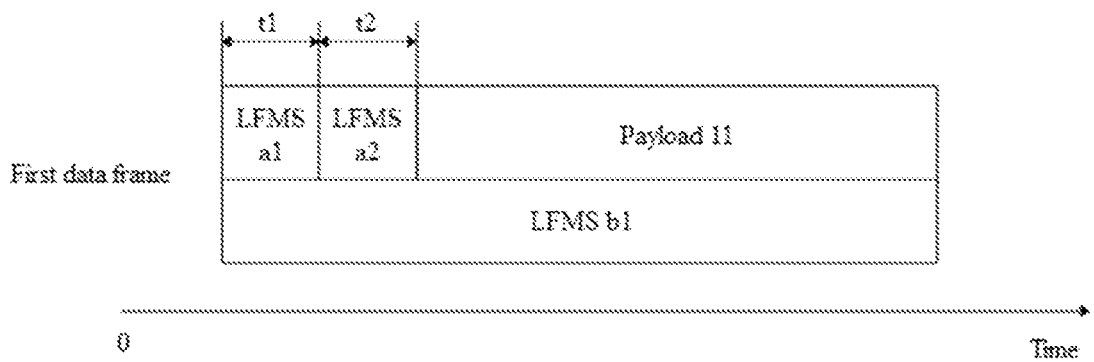
FIG. 6 is a schematic diagram of a structure of a first data frame in time domain according to this application.
Figure 7:
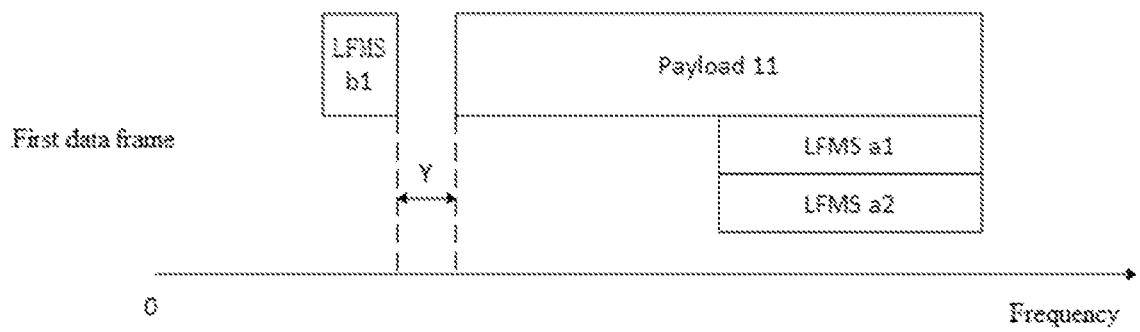
FIG. 7 is a schematic diagram of a structure of a first data frame in frequency domain according to this application.

In another embodiment, the digital signal further includes a discrete LFMS a2 signal and a discrete LFMS b1 signal. In this case, a first data frame obtained based on the digital signal includes the LFMS a1, an LFMS a2, and an LFMS b1. FIG. 6 is a schematic diagram of a structure of a first data frame in time domain according to this application. As shown in FIG. 6, the first data frame includes the LFMS a1, the LFMS a2, and the LFMS b1. In time domain, a range of the LFMS a1 is equal to a range of the LFMS a2. A sum of the range of the LFMS a1, the range of the LFMS a2, and a range of a payload 11 is equal to a range of the LFMS b1. FIG. 7 is a schematic diagram of a structure of a first data frame in frequency domain according to this application. As shown in FIG. 7, the first data frame includes the LFMS a1, the LFMS a2, and the LFMS b1. A range of the LFMS a1 is equal to a range of the LFMS a2. The range of the LFMS a1 overlaps a range of a payload 11. There is a spacing Y between the LFMS a1 and the payload 11. The spacing Y is greater than a first threshold.

Figure 8:
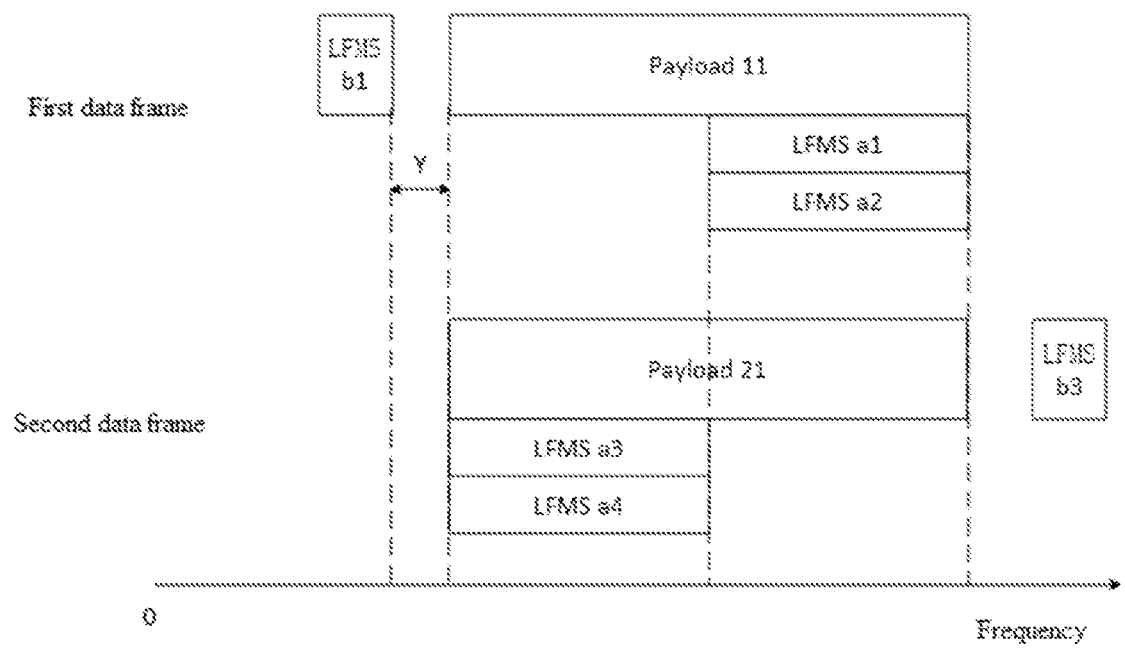
FIG. 8 is a schematic diagram of a structure of a first data frame and a second data frame in frequency domain according to this application.
Figure 9:
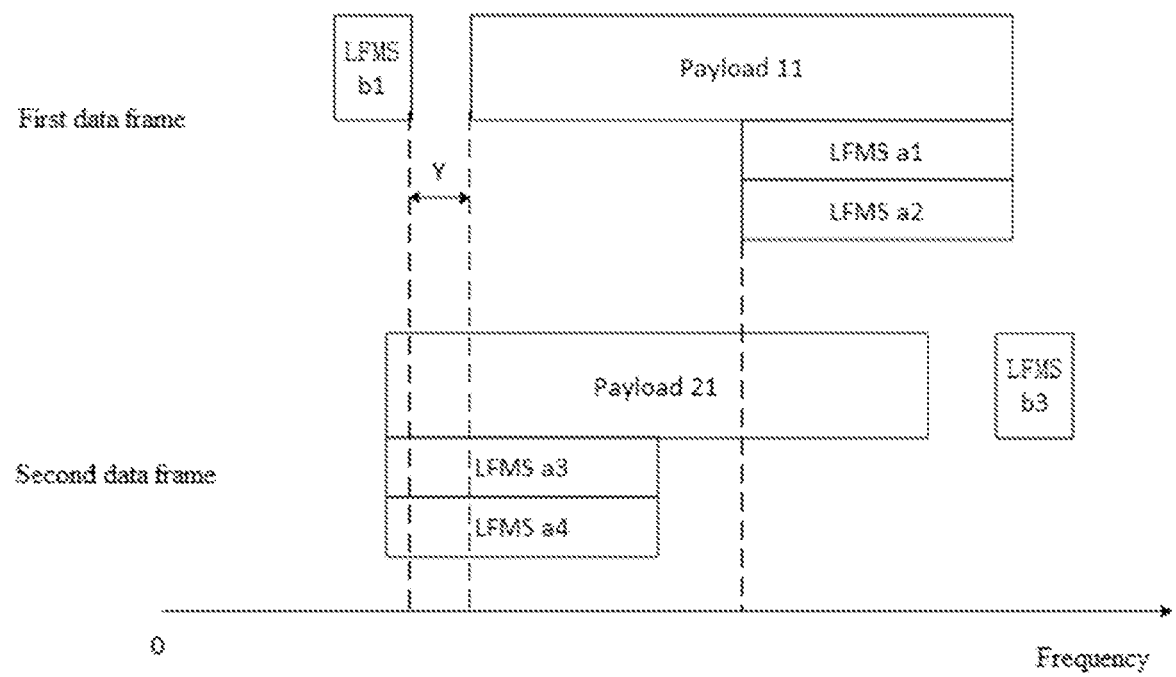
FIG. 9 is a schematic diagram of another structure of a first data frame and a second data frame in frequency domain according to this application.

In another embodiment, the first threshold is 1.0 GHz, 1.5 GHz, 2.0 GHz, or 2.5 GHz. Specifically, FIG. 8 is a schematic diagram of a structure of a first data frame and a second data frame in frequency domain according to this application. As shown in FIG. 8, the first data frame and the second data frame belong to a same channel. Therefore, in frequency domain, a range of a payload 11 in the first data frame is equal to a range of a payload 21 in the second data frame. However, in actual application, there may be a frequency offset between a laser that transmits the first data frame and a laser that transmits the second data frame. For example, FIG. 9 is a schematic diagram of another structure of a first data frame and a second data frame in frequency domain according to this application. Compared with FIG. 8, in FIG. 9, a payload 21 deviates leftward, and consequently, a range of the payload 21 overlaps a range of the LFMS b1. Therefore, a range of the LFMS b1 in a first reflected data frame may also overlap the range of the payload 21. In addition, because power of the LFMS b1 in the first reflected data frame is less than power of the payload 21, the LFMS b1 in the first reflected data frame is covered by the payload 21. Therefore, the spacing Y is defined to be greater than the first threshold.

Further, the spacing Y is less than a second threshold. The second threshold is 2.5 GHz or 3.0 GHz. Specifically, it is assumed that a frequency band range of one channel is 75 GHz, and a frequency range of a payload is 64 GHz. In this case, a frequency range between payloads of different channels is 75/2−64/2=5.5 GHz. The 5.5 GHz range includes one LFMS b1. That is, two spacing areas need to exist in the 5.5 GHz. One of the spacing areas is the spacing Y. The other of the spacing areas is a channel isolation area, which may be specifically used to prevent frequency deviation of the laser of the first device. Generally, a frequency of the laser may change by 2 GHz to 3 GHz as a temperature changes. Therefore, a frequency range of at least 3 GHz needs to be reserved for the channel isolation area. 5.5−3=2.5 GHz. When the second threshold is 2.5 GHz, a frequency range of the channel isolation area is 3 GHz. Similarly, when a frequency band range of one channel is 50 GHz or 100 GHz, an appropriate second threshold may be derived based on the foregoing method.

It should be understood that, the first data frame in FIG. 6 or FIG. 7 is merely an example. In actual application, the first data frame may be adaptively changed. For example, in time domain, seamless junction between the LFMS a1 and the LFMS a2 is not required, that is, there may be a spacing between the LFMS a1 and the LFMS a2. Similarly, seamless junction between the LFMS a2 and the payload 11 is not required. For another example, in time domain, a range of the LFMS b1 is greater than a range of the payload 11, but is less than a sum of a range of the LFMS a1, a range of the LFMS a2, and the range of payload 11. For another example, in frequency domain, it is not required that the LFMS a1 be fully aligned with the LFMS a2, that is, a range of the LFMS a1 may be unequal to a range of the LFMS a2. For another example, in frequency domain, it is not required that the LFMS a1 and the LFMS a2 be aligned with the payload 11 on one side.

In step 402, the first device receives a mixed signal, where the mixed signal includes a second data frame and a first reflected data frame of the first data frame.

The mixed signal may be represented as follows:

$$Rx(n)=\Sigma_{i=1}^{N}F_i(n)+S(n)$$

Rx(n) represents a mixed signal received by the first device at an $n^{th}$ sampling point, $F_i$ represents an $i^{th}$ reflected signal, and S represents a second optical signal (also referred to as the second data frame) sent by the second device. Assuming that a first optical signal $X_i$ (also referred to as a first data frame) of a reflected signal can be learned, the foregoing formula may be modified into the following:

$$Rx(n)=\Sigma_{i=1}^{N}\text{Fiber}\{X_i(n-m_i)\times\exp[i\varphi_i(n-m_i)]\}+S(n)$$

Fiber{·} represents impact of optical fiber transmission, mainly including impact of dispersion, nonlinearity, and birefringence. This application imposes no related limitation on Fiber{·}, which is considered as a known quantity by default. $\varphi_i$ represents carrier phase information carried in the $i^{th}$ reflected signal. $m_i$ represents a time difference between arrival of the $i^{th}$ reflected signal at the first device and arrival of the second data frame at the first device. A time difference in the formula is represented by using a quantity of sampling points. In subsequent descriptions, the time difference is directly represented by using duration. The time difference is also referred to as an offset. For example, a time difference between arrival of the $1^{st}$ reflected signal (also referred to as a first reflected data frame) at the first device and arrival of the second data frame at the first device is referred to as a first offset.

In actual application, the first device may receive one or more reflected signals of the first optical signal. The following provides descriptions by using an example in which the mixed signal includes one reflected signal (the first reflected data frame). It may be learned from the foregoing formula that, the second data frame can be obtained by the first device by eliminating the first reflected data frame from the mixed signal. Therefore, the first device needs to reconstruct the first reflected data frame based on the first data frame to obtain a reconstructed data frame (also referred to as a first reconstructed data frame) of the first reflected data frame. Then, the first device eliminates the first reconstructed data frame from the mixed signal based on the first offset. In addition, higher accuracy of the first reconstructed data frame indicates that the second data frame is better restored. In this application, accuracy may be understood as a degree of similarity between an obtained value and an actual value, for example, a degree of similarity between the first reconstructed data frame and the first reflected data frame.

The second data frame includes an LFMS a3. For descriptions of the LFMS a3, refer to the foregoing descriptions of the LFMS a1. In another embodiment, the second data frame further includes an LFMS a4 and an LFMS b3. For a time-domain relationship among the LFMS a3, the LFMS a4, the LFMS b3, and the payload 21 of the second data frame, refer to the relationship among the LFMS a1, the LFMS a2, the LFMS b1, and the payload 11 of the first data frame. In frequency domain, as shown in FIG. 9, the second data frame includes the LFMS a3, the LFMS a4, the LFMS b3, and the payload 21. The range of the payload 21 is equal to the range of the payload 11. The LFMS b1 and the LFMS b3 are located on two sides of the payload 11 or the payload 21. A range of the LFMS a3 is equal to a range of the LFMS a4. A sum of the range of the LFMS a3 and the range of the LFMS a1 is equal to the range of the payload 11 or the payload 21.

Figure 10:
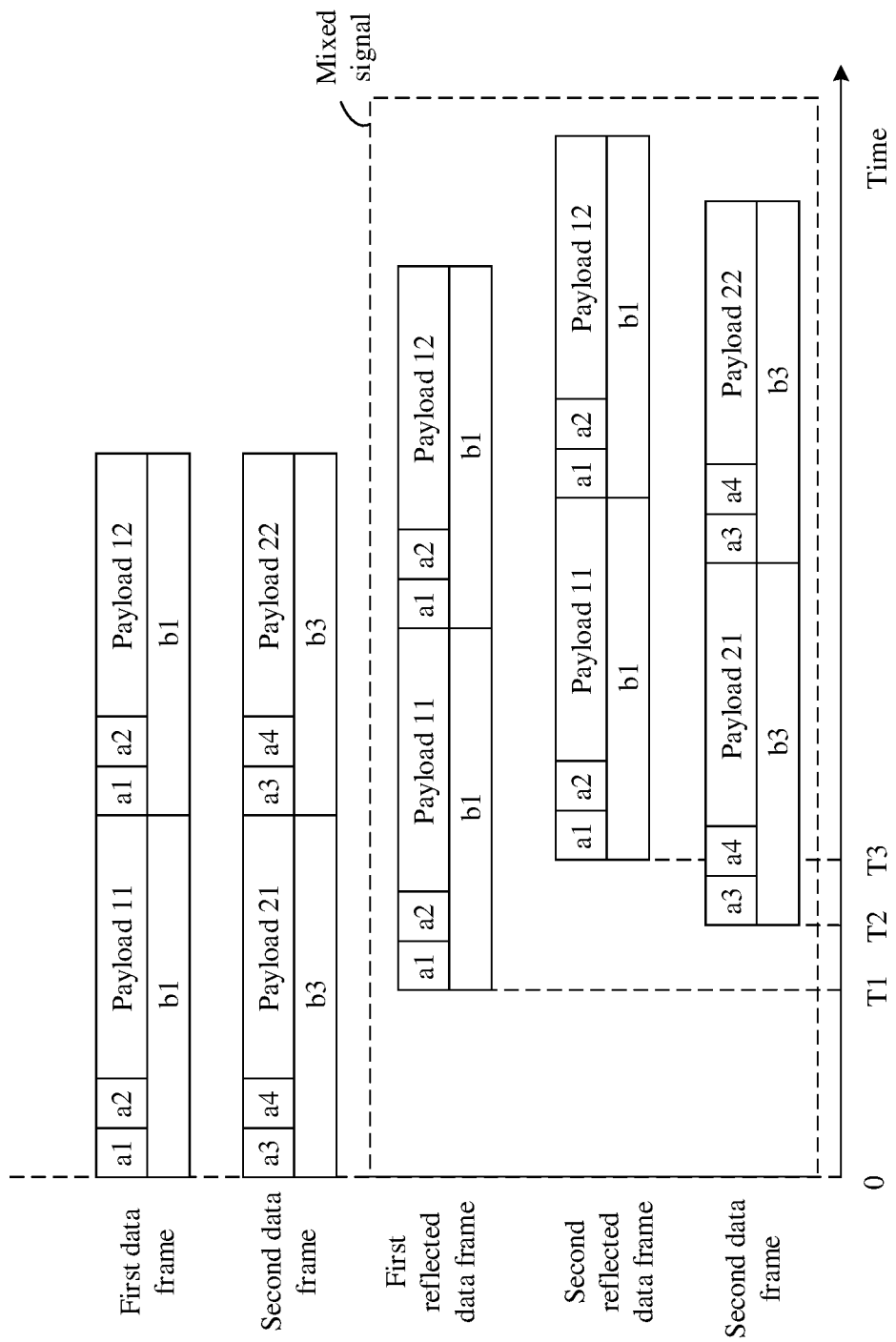
FIG. 10 is a schematic diagram of a structure of a mixed signal in time domain according to this application.

FIG. 10 is a schematic diagram of a structure of a mixed signal in time domain according to this application. In addition to the mixed signal, FIG. 10 shows two first data frames and two second data frames. The first data frame includes an LFMS a1 (a1 for short in the figure), an LFMS a2 (a2 for short in the figure), an LFMS b1 (b1 for short in the figure), and a payload. One of the first data frames includes a payload 11, and the other of the first data frames includes a payload 12. The second data frame includes an LFMS a3 (a3 for short in the figure), an LFMS a4 (a4 for short in the figure), an LFMS b3 (b3 for short in the figure), and a payload. One of the first data frames includes a payload 21, and the other of the first data frames includes a payload 22.

The mixed signal includes a first reflected data frame of the first data frame. The first reflected data frame carries content similar to that of the first data frame. For example, the first reflected data frame includes reflected signals of the LFMS a1, the LFMS a, and the LFMS b1, and the payload 11. It is assumed that a moment at which the first device sends the first data frame is a reference moment, and the reference moment is 0. A moment at which the first device receives the first reflected data frame is T1. A first delay T1 exists between the moment at which the first device receives the first reflected data frame and the reference moment. Related content of a second reflected data frame is presented in subsequent descriptions.

The mixed signal further includes a second data frame. It is assumed that a moment at which the second device sends the second data frame is also the reference moment. A moment at which the first device receives the second data frame is T2. A second delay T2 exists between the moment at which the first device receives the second data frame and the reference moment.

In step 403, the first device obtains the first offset based on the LFMS a1 in the first reflected data frame.

That the first device obtains the first offset based on the LFMS a1 in the first reflected data frame may also be understood as follows: The first device obtains the first offset based on the LFMS a1 in the first reflected data frame and the LFMS a1 in the first data frame. The first offset is a time-domain difference between the first reflected data frame and the second data frame in the mixed signal. To be specific, the first offset is equal to a difference between the first delay T1 and the second delay T2. Therefore, the first device needs to first obtain the first delay T1 and the second delay T2, and then calculate the difference based on the first delay T1 and the second delay T2. The first delay T1 includes a rough first delay T1 or a precise first delay T1. The first device may calculate the first offset based on the rough first delay T1 and the second delay T2, or may calculate the first offset based on the precise first delay T1 and the second delay T2.

Figure 11:
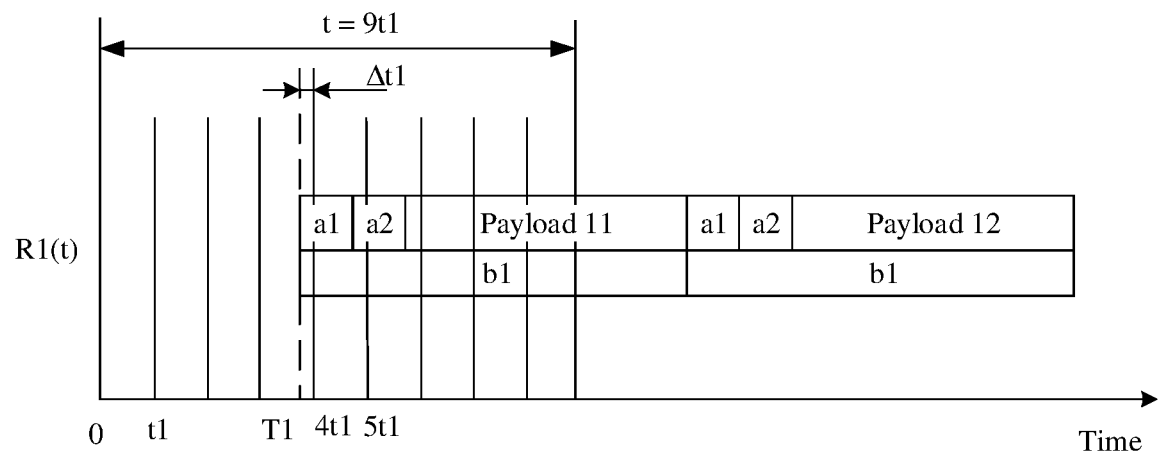
FIG. 11 is a schematic diagram of a structure of K first sequences according to this application.

The following describes a process in which the first device obtains the rough first delay T1. FIG. 11 is a schematic diagram of a structure of K first sequences according to this application. The first device divides the mixed signal in time domain into K sequence blocks whose lengths are equal to that of the LFMS a1, to obtain the K first sequences, and K is an integer greater than 1. In this method, the second data frame in the mixed signal is not needed in calculation of the first delay T1. Therefore, related content of the second data frame is not presented in the mixed signal in FIG. 11. As shown in FIG. 11, it is assumed that K is 9. Starting from the reference moment 0, the first device divides the mixed signal into nine sequence blocks whose lengths are equal to that of the LFMS a1. Each sequence block is referred to as a first sequence. A length of each first sequence is t1, and a total length of the nine first sequences is t=9t1. The first device performs fractional Fourier transform at an angle a1 on the nine first sequences to obtain nine first functions. The first device obtains a maximum modulus value of each first function to obtain a total of nine maximum modulus values. Then, the first device determines a maximum value in the nine maximum modulus values, and refers to the maximum value as a first target modulus value. A first sequence corresponding to the first target modulus value is referred to as a first target sequence. A start moment of the first target sequence is a first target moment. The first delay T1 is equal to a difference between the reference moment and the first target moment. As shown in FIG. 11, the $5^{th}$ first sequence includes a reflected signal of most of the LFMS a1, and a maximum modulus value corresponding to the first sequence is the maximum value in the nine maximum modulus values. That is, the $5^{th}$ first sequence is the first target sequence, and the first target moment is 4t1. The rough first delay T1 is equal to the difference between the first target moment and the reference moment, that is, the rough first delay T1 is equal to 4t1.

It should be understood that, the foregoing is only an example in which the first delay T1 is obtained by using the LFMS a1 in the first reflected data frame. In actual application, the first device may further obtain the first delay T1 in another manner. For example, the first device determines the first delay T1 by using an optical time domain reflectometer.

In another embodiment, the total length t is equal to a sum of duration of one first data frame, interval duration between data frames, and duration of one LFMS a1. The foregoing interval duration (not shown in the figure) exists between different first data frames received by the first device. It should be understood that, the obtaining the first delay T1 in the foregoing description is to determine a frame header location of the first reflected data frame. In FIG. 11, the reference moment is the moment at which the first device sends the first data frame. When the reference moment is any moment after the first device receives the first reflected data frame, the first device only needs to ensure that the total length t includes duration of a reflected signal of one complete LFMS a1, and the first device can determine the frame header location of the first reflected data frame by using the foregoing method. By limiting the total length t, a quantity of first sequences obtained by division by the first device can be reduced, and a time for obtaining the first delay T1 by the first device can be shorten. Therefore, a delay between the first device and the second device can be reduced.

It should be understood that, when the first data frame includes the LFMS a2, the first device may obtain the first delay T1 based on the LFMS a2 in a similar manner. Specifically, as shown in FIG. 11, in time domain, the first device divides the mixed signal into H sequence blocks whose lengths are equal to that of the LFMS a2, to obtain H second sequences, and H is an integer greater than 1. Because duration of the LFMS a2 is equal to duration of the LFMS a1, the first sequence is equal to the second sequence. Because the $6^{th}$ second sequence includes a reflected signal of most of the LFMS a2, and a maximum modulus value corresponding to the second sequence is the maximum value in the nine maximum modulus values. That is, the $6^{th}$ second sequence is a second target sequence, and a second target moment is 5t1. The rough first delay T1 is equal to 5t1 minus the duration of the LFMS a1, that is, the rough first delay T1 is equal to 5t1−t1=4t1. When the first data frame includes the LFMS a2 and the LFMS a1, the first device selects the LFMS a2 or the LFMS a1 to determine the rough first delay T1.

The foregoing describes a method for obtaining the rough first delay T1. As shown in FIG. 11, the rough first delay T1 is 4t1, and a difference Δt1 (also referred to as a first corrected value) exists between 4t1 and T1. The first device may correct the rough first delay T1 by using the first corrected value, to obtain the precise first delay T1. The following describes a process in which the first device obtains the first corrected value.

Figure 12:
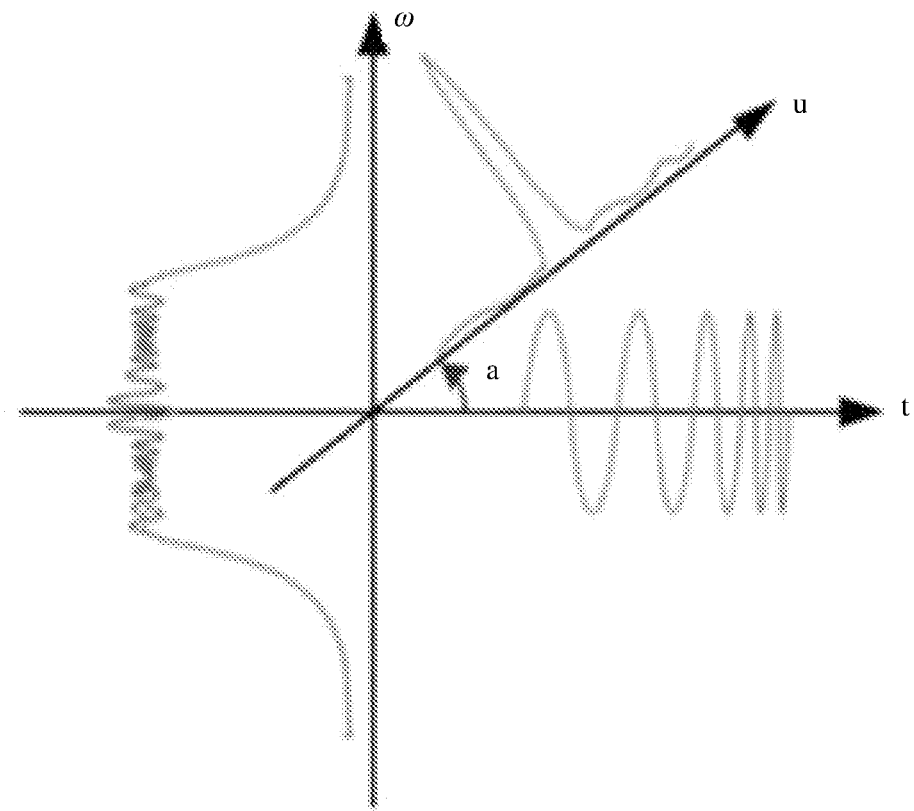
FIG. 12 is a schematic diagram of waveforms of an LFMS in time domain, frequency domain, and fractional domain according to this application.
Figure 13:
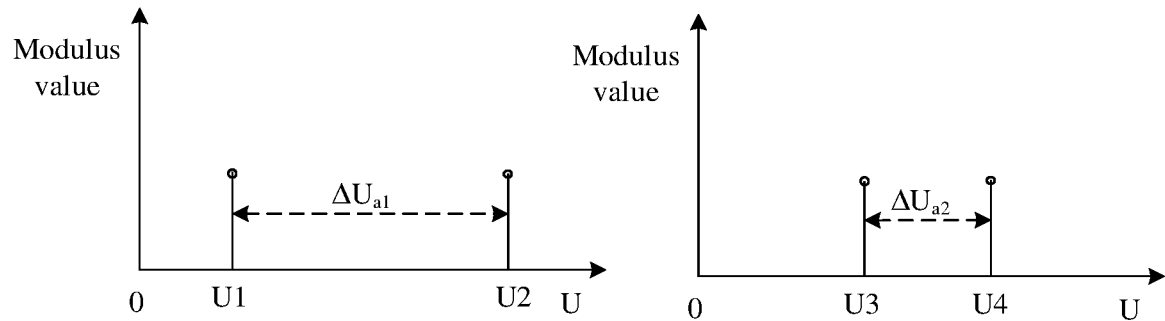
FIG. 13 is a schematic diagram of structures of an a1 independent-variable difference $\Delta U_{a1}$ and an a2 independent-variable difference $\Delta U_{a2}$ in fractional domain according to this application.

FIG. 12 is a schematic diagram of waveforms of an LFMS in time domain, frequency domain, and fractional domain according to this application. A waveform graph of the LFMS in time domain is on a t-axis. A waveform graph of the LFMS in fractional domain is on a U-axis. A waveform graph of the LFMS in fractional domain is on a ω-axis. After fractional Fourier transform at an angle a is performed on the LFMS on the t-axis, the waveform graph on the U-axis can be obtained. A vertical coordinate on the U-axis is modulus value. In the foregoing step 401, the first device obtains the digital signal of the first data frame by using the discrete LFMS a1 signal and the discrete signal. The first device retains the discrete LFMS a1 signal (referred to as the LFMS a1 for short below). The first device performs fractional Fourier transform at the angle a1 on the LFMS a1 in time domain to obtain an a1 impulse function. A horizontal coordinate of a maximum modulus value of the a1 impulse function is U1. In the foregoing process of obtaining the rough first delay T1, the first device determines the first target modulus value. Correspondingly, a horizontal coordinate of the first target modulus value is U2. FIG. 13 is a schematic diagram of structures of an a1 independent-variable difference $\Delta U_{a1}$ and an a2 independent-variable difference $\Delta U_{a2}$ in fractional domain according to this application. As shown in FIG. 13, the a1 independent-variable difference $\Delta U_{a1}$=U2−U1.

Similarly, the first device obtains the a2 independent-variable difference $\Delta U_{a2}$. Specifically, in time domain, the first device divides the mixed signal into H sequence blocks whose lengths are equal to that of the LFMS a2, to obtain H second sequences, and H is an integer greater than 1. The first device performs fractional Fourier transform at an angle a2 on the H second sequences to obtain H second functions. The first device obtains a maximum modulus value of each second function to obtain a total of H maximum modulus values. Then, the first device determines a maximum value in the H maximum modulus values, and refers to the maximum value as a second target modulus value. A second sequence corresponding to the second target modulus value is referred to as a second target sequence. A horizontal coordinate of the second target sequence is U4. The first device performs fractional Fourier transform at the angle a2 on the LFMS a2 to obtain an a2 impulse function, where a horizontal coordinate of a maximum modulus value of the a2 impulse function is U3. As shown in FIG. 13, the a2 independent-variable difference $\Delta U_{a2}$=U4−U3.

The first device performs calculation based on the obtained ΔU a2 and ΔU a1 by using the following formulas:

$$\Delta U_{a1}=\Delta t1\ \cos(a1)+\Delta f_a \sin(a1);\text{ and}$$

$$\Delta U_{a2} = \Delta t1 \cos(a2) + \Delta f_a \sin(a2)$$

Δt1 is the first corrected value, $\Delta f_a$ is a frequency offset between the first data frame and the first reflected data frame, a1 is an angle of the LFMS a1, and a2 is an angle of the LFMS a2.

After the first device obtains the first corrected value, the first device corrects the rough first delay T1 by using the first corrected value, to obtain the precise first delay T1.

It should be understood that, the duration of the LFMS a1 affects a size of the first corrected value. Generally, shorter duration of the LFMS a1 indicates a smaller first corrected value. When the duration of the LFMS a1 is short enough, the first corrected value may be less than a threshold. In this case, the first device may correct the rough first delay T1 without using the first corrected value. In other words, the first device may obtain the first offset based on the rough first delay T1.

The foregoing describes the process in which the first device obtains the first delay T1. Similarly, the first device may obtain the second delay T2 based on the LFMS a3 and the LFMS a4. The second delay T2 may be a precise second delay T2, or may be a rough second delay T2. Then, the first device obtains the first offset based on the first delay T1 and the second delay T2.

In step 404, the first device obtains a reconstructed data frame of the first reflected data frame based on the first data frame.

It may be learned from the foregoing descriptions that, higher accuracy of the first reconstructed data frame is more conducive to improving quality of an obtained signal. Therefore, in this application, it is expected to obtain carrier phase information in the first reflected data frame, and then the first reflected data frame is reconstructed by using the carrier phase information, thereby improving accuracy of the first reconstructed data frame. Specifically, the first device includes the LFMS b1 in the first data frame, and subsequently obtains the carrier phase information by using the LFMS b1 in the first reflected data frame. Obtaining the carrier phase information by using the LFMS b1 in the first reflected data frame may also be understood as obtaining the carrier phase information by using the LFMS b1 in the first reflected data frame and the LFMS b1 in the first data frame. For descriptions of the LFMS b1, refer to the foregoing descriptions of the step 401. The following describes a process in which the first device obtains the carrier phase information based on the LFMS b1.

The first device extracts the first reflected data frame in the mixed signal in time domain. The first device obtains, by filtering, the LFMS b1 in the first reflected data frame in frequency domain. The first device performs fractional Fourier transform on the LFMS b1 in the first reflected data frame in time domain to obtain a b1 impulse function. The first device performs inverse fractional Fourier transform on a target impulse function to obtain an LFMS b2. The target impulse function is a part that is in the b1 impulse function and that includes a maximum modulus value. Specifically, a horizontal coordinate of the b1 impulse function is a value on the U-axis, and a vertical coordinate is a modulus value. It is assumed that the b1 impulse function falls within a horizontal coordinate range of 0 to 500, and a horizontal coordinate of a maximum modulus value of the b1 impulse function is 200. In this case, the target impulse function may be a part that is extracted from the b1 impulse function and that includes the horizontal coordinate 200. For example, the target impulse function is a part, of the b1 impulse function, between horizontal coordinates 150 and 250. For example, the target impulse function is a part, of the b1 impulse function, between horizontal coordinates 180 and 250. The first device performs fractional Fourier transform at an angle b1 on the LFMS b1 to obtain a b1 impulse function, where a horizontal coordinate of a maximum modulus value of the b1 impulse function is $\Delta U_{b1}$. The first device obtains a frequency offset value $\Delta f_b$ based on $\Delta U_{b1}$. Specifically, the first device obtains $\Delta f_b$ based on the following formula:

$$\Delta U_{b1} = \Delta f_b \times \sin(b1)$$

$\Delta f_b$ is the frequency offset value, and b1 is an angle of the LFMS b1. The first device performs frequency deviation on the LFMS b2 by using $\Delta f_b$. The first device performs division on the LFMS b2 and the LFMS b1 to obtain a complex-valued function. The first device obtains the carrier phase information of the complex-valued function. Then, the first device obtains the first reconstructed data frame based on the first data frame and the carrier phase information.

In step 405, the first device eliminates the reconstructed data frame of the first reflected data frame from the mixed signal based on the first offset, to obtain a first initial signal of the second data frame.

In the foregoing step 403, the first device obtains the first offset and the second delay T2. Therefore, the first device may eliminate the first reconstructed data frame from the mixed signal when an offset between the first reconstructed data frame and the second data frame is the first offset.

In another embodiment, the mixed signal further includes a second reflected data frame of the first data frame. As shown in FIG. 10, a delay between the second reflected data frame and the reference moment is a third delay T3. The first device obtains a second offset based on the LFMS a1 in the first reflected data frame. The second offset is a time-domain offset (a difference between the third delay T3 and the second delay T2) between the second reflected data frame and the second data frame. For a specific procedure, refer to the foregoing related descriptions of obtaining the first offset by the first device. The first device further obtains a reconstructed data frame of the second reflected data frame based on the first data frame, and eliminates the reconstructed data frame of the second reflected data frame from the first initial signal based on the second offset, to obtain a second initial signal of the second data frame.

Further, power of the second reflected data frame is less than power of the first reflected data frame. In this embodiment of this application, the first device first eliminates the reconstructed data frame of the first reflected data frame from the mixed signal to obtain the first initial signal. Then, the first device eliminates the reconstructed data frame of the second reflected data frame from the first initial signal to obtain the second initial signal. Compared with that the first device first eliminates the reconstructed data frame of the second reflected data frame from the mixed signal to obtain the first initial signal, and then eliminates the reconstructed data frame of the first reflected data frame from the first initial signal to obtain the second initial signal, in this application, quality of the finally obtained second initial signal can be improved.

It should be understood that, when a delay exists between the first reflected data frame and the second reflected data frame, carrier phase information extracted by the first device from the first reflected data frame may be different from that extracted by the first device from the second reflected data frame. Therefore, even if the first device always obtains the reconstructed data frame based on the first data frame, the reconstructed data frame of the first reflected data frame and the reconstructed data frame of the second reflected data frame may be different.

Figure 14:
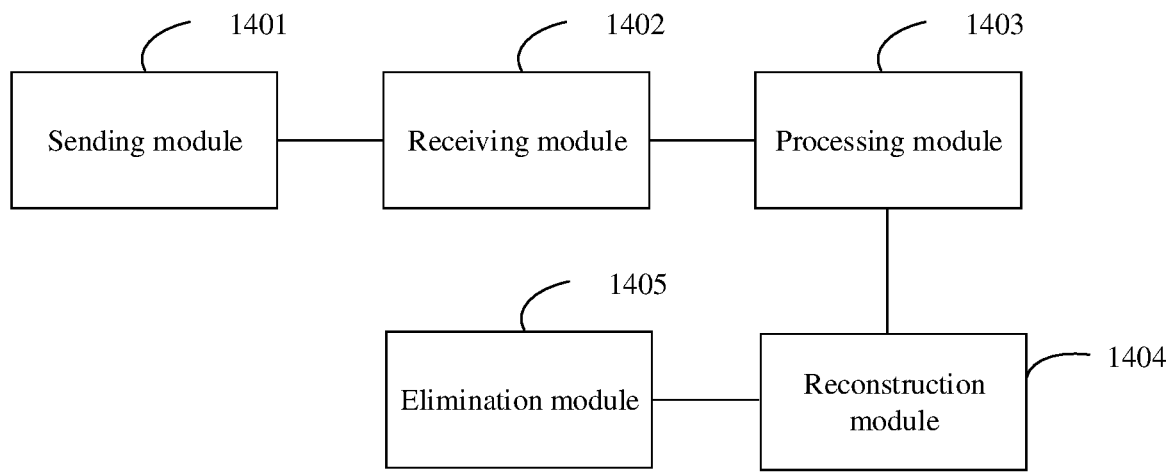
FIG. 14 is a schematic diagram of a structure of a receiving apparatus according to an embodiment of this application.
Figure 15:
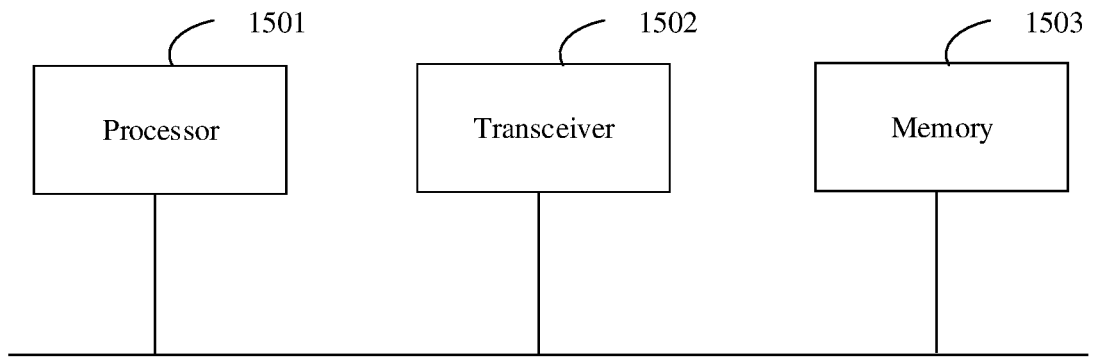
FIG. 15 is a schematic diagram of a structure of a receiving device according to an embodiment of this application.

The foregoing describes the data receiving method in this application, and the following describes a receiving apparatus provided in this application. FIG. 14 is a schematic diagram of a structure of a receiving apparatus according to an embodiment of this application. As shown in FIG. 14, the receiving apparatus includes a sending module 1401, a receiving module 1402, a processing module 1403, a reconstruction module 1404, and an elimination module 1405. The sending module 1401 is configured to send a first data frame to a second device, where the first data frame includes an LFMS a1. The receiving module 1402 is configured to receive a mixed signal, where the mixed signal includes a first reflected data frame of the first data frame and a second data frame sent by the second device. The processing module 1403 is configured to obtain a first offset based on the LFMS a1 in the first reflected data frame, where the first offset is a time-domain offset between the first reflected data frame and the second data frame. The reconstruction module 1404 is configured to obtain a reconstructed data frame of the first reflected data frame based on the first data frame. The elimination module 1405 is configured to eliminate the reconstructed data frame of the first reflected data frame from the mixed signal based on the first offset, to obtain a first initial signal of the second data frame.

In another embodiment, the modules in the receiving apparatus are specifically configured to perform all or some operations that may be performed by the first device in the embodiment corresponding to FIG. 4.

The following describes a receiving device in an embodiment of this application. FIG. is a schematic diagram of a structure of a receiving device according to an embodiment of this application.

The receiving device includes a processor 1501 and a transceiver 1502. The processor 1501 and the transceiver 1502 are interconnected by using a line.

The processor 1501 may be a central processing unit (CPU), a network processor (NP), or a combination of a CPU and an NP. The processor 1501 may further include a hardware chip or another general-purpose processor. The foregoing hardware chip may be an application-specific integrated circuit (ASIC), a programmable logic device (PLD), or a combination thereof.

The transceiver 1502 may be a fiber transceiver, a radio frequency module, or the like.

Optionally, the receiving device further includes a memory 1503. The memory 1503 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory.

The receiving device may be the first device corresponding to the foregoing embodiment in FIG. 4. The transceiver 1502 is specifically configured to send a first data frame to a second device, where the first data frame includes an LFMS a1. The transceiver 1502 is further configured to receive a mixed signal, where the mixed signal includes a first reflected data frame of the first data frame and a second data frame sent by the second device. The processor 1501 is configured to perform, based on the first data frame and the mixed signal, all or some operations that may be performed by the first device in the foregoing embodiment in FIG. 4.

This application further provides a digital processing chip. The digital processing chip integrates a circuit and one or more interfaces that are configured to implement the function of the processor 1501. When a memory is integrated into the digital processing chip, the digital processing chip can complete the method steps in any one or more of the foregoing embodiments. When no memory is integrated into the digital processing chip, the digital processing chip may be connected to an external memory over an interface. Based on program code stored in an external memory, the digital processing chip implements the actions performed by the first device in the foregoing embodiments.

The foregoing descriptions are merely specific implementations of this application, and are not intended to limit the protection scope of this application. The modifications or replacements readily figured out by a person skilled in the art within the technical scope disclosed in this application shall all fall within the protection scope of this application.

What is claimed is:

1. A data receiving method, comprising:
   sending, by a first device, a first data frame to a second device, wherein the first data frame comprises a first linear frequency modulated sequence (LFMS);
   receiving, by the first device, a mixed signal, wherein the mixed signal comprises a first reflected data frame of the first data frame and a second data frame sent by the second device;
   obtaining, by the first device, a first offset based on the first LFMS in the first reflected data frame, wherein the first offset is a time-domain offset between the first reflected data frame and the second data frame;
   obtaining, by the first device, a reconstructed data frame of the first reflected data frame based on the first data frame; and
   obtaining, by the first device, a first initial signal of the second data frame by eliminating the reconstructed data frame of the first reflected data frame from the mixed signal based on the first offset.

2. The method according to claim 1, wherein the second data frame comprises a second LFMS, and obtaining, by the first device, the first offset based on the first LFMS in the first reflected data frame comprises:
   obtaining, by the first device, a first delay based on the first LFMS in the first reflected data frame, wherein the first delay represents a time difference between a moment at which the first device receives the first reflected data frame and a reference moment; and
   obtaining, by the first device, a second delay based on the second LFMS in the second data frame, wherein the second delay represents a time difference between a moment at which the first device receives the second data frame and the reference moment, wherein the first offset is equal to a difference between the first delay and the second delay.

3. The method according to claim 2, wherein the reference moment is a moment at which the first device sends the first data frame.

4. The method according to claim 2, wherein obtaining, by the first device, the first delay based on the first LFMS a1 the first reflected data frame comprises:
   performing, by the first device, fractional Fourier transform at a first angle on K first sequences to obtain K maximum modulus values of K first functions, wherein each first function corresponds to one maximum modulus value, the K first sequences are K sequence blocks that are obtained by dividing the mixed signal in time domain and whose lengths are equal to that of the first LFMS, and K is an integer greater than 1, wherein the first delay is equal to a difference between the reference moment and a start moment of a first target sequence in the K first sequences, and the first target sequence corresponds to a maximum value in the K maximum modulus values.

5. The method according to claim 4, wherein the first data frame further comprises a third LFMS, and the second data frame further comprises a fourth LFMS, and the method further comprises:
  performing, by the first device, fractional Fourier transform at the first angle on the first LFMS to obtain a first impulse function, wherein a horizontal coordinate of a maximum modulus value of the first impulse function is U1, a horizontal coordinate of the first target modulus value is U2, and a first independent-variable difference $\Delta U_{a1}$=U2−U1;
  performing, by the first device, fractional Fourier transform at a second angle on H second sequences to obtain H maximum modulus values of H second functions, wherein each second function corresponds to one maximum modulus value, the H second sequences are H sequence blocks that are obtained by dividing the mixed signal in time domain and whose lengths are equal to that of the third LFMS, and H is an integer greater than 1;
  performing, by the first device, fractional Fourier transform at the second angle on the third LFMS to obtain a second impulse function, wherein a horizontal coordinate of a maximum modulus value of the second impulse function is U3, a horizontal coordinate of a second target modulus value is U4, the second target modulus value is a maximum value in the H maximum modulus values, and a second independent-variable difference $\Delta U_{a2}$=U4−U3;
  obtaining, by the first device, a first corrected value based on $\Delta U_{a1}$ and $\Delta U_{a2}$; and
  correcting, by the first device, the first delay based on the first corrected value.

6. The method according to claim 5, wherein the obtaining, by the first device, a first corrected value based on $\Delta U_1$ and $\Delta U_2$ comprises:
  obtaining, by the first device, the first corrected value based on the following formulas:

$\Delta U_{a1} = \Delta t1\, \cos(a1) + \Delta f_a \sin(a1)$; and $\Delta U_{a2} = \Delta t1\, \cos(a2) + \Delta f_a \sin(a2)$; wherein $\Delta t1$ is the first corrected value, $\Delta f_a$ is a frequency offset between the first data frame and the first reflected data frame, a1 is the first angle of the first LFMS, and a2 is the second angle of the third LFMS.

7. The method according to claim 5, wherein the first LFMS is the same as the second LFMS, and the fourth LFMS is the same as the third LFMS.

8. The method according to claim 5, wherein in frequency domain, the first LFMS overlaps the third LFMS, the second LFMS overlaps the fourth LFMS, the first LFMS does not overlap the second LFMS, and a sum of frequency ranges of the second LFMS and the first LFMS is equal to a frequency range of a payload of the first data frame or the second data frame.

9. The method according to claim 5, wherein in time domain, the first LFMS or the third LFMS are before a payload of the first data frame.

10. The method according to claim 5, wherein in time domain, the first LFMS does not overlap the third LFMS, and the first LFMS and the third LFMS do not overlap a payload of the first data frame.

11. The method according to claim 1, wherein the first data frame further comprises a fifth LFMS, and the method further comprises:
  obtaining, by the first device, carrier phase information of the first reflected data frame based on the fifth LFMS in the first reflected data frame, wherein obtaining, by the first device, the reconstructed data frame of the first reflected data frame based on the first data frame comprises obtaining, by the first device, the reconstructed data frame of the first reflected data frame based on the first data frame and the carrier phase information.

12. The method according to claim 11, wherein before obtaining, by the first device, carrier phase information of the first reflected data frame based on the LFMS b1 in the first reflected data frame, the method further comprises:
  performing, by the first device, fractional Fourier transform at a third angle on the fifth LFMS to obtain a third impulse function, wherein a horizontal coordinate of a maximum modulus value of the third impulse function is $\Delta U_{b1}$;
  obtaining, by the first device, a frequency offset value $\Delta f_b$ based on $\Delta U_{b1}$, wherein $\Delta U_{b1} = \Delta f_b \times \sin(b1)$, $\Delta f_b$ is a frequency offset obtained after $\Delta f_a$ is corrected, and b1 is the third angle of the fifth LFMS; and
  performing, by the first device, frequency deviation on the fifth LFMS in the first reflected data frame based on $\Delta f_b$.

13. The method according to claim 12, wherein obtaining, by the first device, carrier phase information of the first reflected data frame based on the fifth LFMS in the first reflected data frame comprises:
  extracting, by the first device, the first reflected data frame in the mixed signal;
  obtaining, by the first device by filtering, the fifth LFMS in the first reflected data frame;
  performing, by the first device, fractional Fourier transform on the fifth LFMS in the first reflected data frame to obtain a third impulse function;
  performing, by the first device, inverse fractional Fourier transform on a target impulse function to obtain a sixth LFMS, wherein the target impulse function is a part that is in the third impulse function and that comprises a maximum modulus value; and
  performing, by the first device, frequency deviation on the first LFMS in the first reflected data frame based on $\Delta f_b$ comprises:
    performing, by the first device, frequency deviation on the sixth LFMS based on $\Delta f_b$;
    performing, by the first device, division on the sixth LFMS and the fifth LFMS to obtain a complex-valued function; and
    obtaining, by the first device, the carrier phase information of the complex-valued function.

14. A receiving apparatus, comprising:
  a transceiver configured to send a first data frame to a second device, wherein the first data frame comprises a first linear frequency modulated sequence (LFMS) and to receive a mixed signal, wherein the mixed signal comprises a first reflected data frame of the first data frame and a second data frame sent by the second device;
  one or more processors; and a non-transitory computer-readable storage medium storing a program to be executed by the processor, the program including instructions for:
obtaining a first offset based on the first LFMS in the first reflected data frame, wherein the first offset is a time-domain offset between the first reflected data frame and the second data frame;
obtaining a reconstructed data frame of the first reflected data frame based on the first data frame; and
obtaining a first initial signal of the second data frame by eliminating the reconstructed data frame of the first reflected data frame from the mixed signal based on the first offset.

15. The apparatus according to claim 14, wherein the second data frame comprises an second LFMS, the program including further instructions for:
obtaining a first delay based on the first LFMS in the first reflected data frame, wherein the first delay represents a time difference between a moment at which the receiving apparatus receives the first reflected data frame and a reference moment; and
obtaining a second delay based on the second LFMS in the second data frame, wherein the second delay represents a time difference between a moment at which the receiving apparatus receives the second data frame and the reference moment, wherein the first offset is equal to a difference between the first delay and the second delay.

16. The apparatus according to claim 15, wherein the program includes further instructions for:
performing fractional Fourier transform at a first angle on K first sequences to obtain K maximum modulus values of K first functions, wherein each first function corresponds to one maximum modulus value, the K first sequences are K sequence blocks that are obtained by dividing the mixed signal in time domain and whose lengths are equal to that of the first LFMS, and K is an integer greater than 1, wherein the first delay is equal to a difference between the reference moment and a start moment of a first target sequence in the K first sequences, and the first target sequence corresponds to a maximum value in the K maximum modulus values.

17. The apparatus according to claim 16, wherein the first data frame further comprises a third LFMS, and the second data frame further comprises a fourth LFMS, wherein the program includes further instructions for:
performing fractional Fourier transform at the first angle on the first LFMS to obtain a first impulse function, wherein a horizontal coordinate of a maximum modulus value of the first impulse function is U1, a horizontal coordinate of the first target modulus value is U2, and a first independent-variable difference $\Delta U_{a1} = U2-U1$;
performing fractional Fourier transform at a second angle on H second sequences to obtain H maximum modulus values of H second functions, wherein each second function corresponds to one maximum modulus value, the H second sequences are H sequence blocks that are obtained by dividing the mixed signal in time domain and whose lengths are equal to that of the third LFMS, and H is an integer greater than 1;
performing fractional Fourier transform at the second angle on the third LFMS to obtain a second impulse function, wherein a horizontal coordinate of a maximum modulus value of the second impulse function is U3, a horizontal coordinate of a second target modulus value is U4, the second target modulus value is a maximum value in the H maximum modulus values, and a second independent-variable difference $\Delta U_{a2} = U4-U3$;
obtaining a first corrected value based on $\Delta U_{a1}$ and $\Delta U_{a2}$; and
correcting the first delay based on the first corrected value.

18. A chip, comprising:
one or more circuits; and
an interface,
wherein the interface is configured to receive a mixed signal, wherein the mixed signal comprises a first reflected data frame of a first data frame and a second data frame sent by a second device; and
wherein the one or more circuits are configured to perform a data receiving method, wherein the method comprises:
sending a first data frame to a second device, wherein the first data frame comprises a first linear frequency modulated sequence (LFMS);
receiving a mixed signal, wherein the mixed signal comprises a first reflected data frame of the first data frame and a second data frame sent by the second device;
obtaining a first offset based on the first LFMS in the first reflected data frame, wherein the first offset is a time-domain offset between the first reflected data frame and the second data frame;
obtaining a reconstructed data frame of the first reflected data frame based on the first data frame; and
obtaining a first initial signal of the second data frame by eliminating the reconstructed data frame of the first reflected data frame from the mixed signal based on the first offset.

19. The chip according to claim 18, wherein the second data frame comprises a second LFMS, and obtaining the first offset based on the first LFMS in the first reflected data frame comprises:
obtaining a first delay based on the first LFMS in the first reflected data frame, wherein the first delay represents a time difference between a moment at which the one or more circuits receive the first reflected data frame and a reference moment; and
obtaining a second delay based on the second LFMS in the second data frame, wherein the second delay represents a time difference between a moment at which the one or more circuits receive the second data frame and the reference moment; wherein
the first offset is equal to a difference between the first delay and the second delay.

20. The chip according to claim 19, wherein the reference moment is a moment at which the one or more circuits sends the first data frame.

* * * * *